Sept. 18, 1951    D. J. McINTOSH ET AL    2,568,650
CHAIN STRUCTURE

Filed Feb. 16, 1948    3 Sheets-Sheet 1

INVENTORS
DONALD J. MCINTOSH
MITCHELL SMITH
BY
Whittemore, Hulbert
& Belknap    ATTORNEYS Sept. 18, 1951     D. J. McINTOSH ET AL     2,568,650
CHAIN STRUCTURE Filed Feb. 16, 1948     3 Sheets-Sheet 2

INVENTORS
DONALD J. McINTOSH
MITCHELL SMITH
BY Whittemore, Hulbert
& Belknap
ATTORNEYS Sept. 18, 1951  D. J. McINTOSH ET AL  2,568,650
CHAIN STRUCTURE Filed Feb. 16, 1948  3 Sheets-Sheet 3

INVENTORS
DONALD J. McINTOSH
MITCHELL SMITH
BY Whittemore, Hulbert
& Belknap
ATTORNEYS Patented Sept. 18, 1951

2,568,650

UNITED STATES PATENT OFFICE 2,568,650

CHAIN STRUCTURE

Donald J. McIntosh and Mitchell Smith, Detroit, Mich., assignors, by mesne assignments, to said Mitchell Smith, Detroit, Mich.

Application February 16, 1948, Serial No. 8,664

1 Claim. (Cl. 74—255)

The present invention relates to chain structure and more specifically to chain structure designed to facilitate separation between links of a sprocket chain.

The present invention is a continuation-in-part of copending application, Serial Number 793,736, entitled "Chain Structure" and filed December 24, 1947.

It is an object of the present invention to provide a chain of the sprocket type adapted to be separated between adjacent links thereof by a simple operation.

More specifically, it is an object of the present invention to provide a sprocket chain having means for separating the chain between adjacent links, the separation being rendered possible by establishing an angularity between adjacent links or link plates which is greater than the angularity assumed by these parts during normal operation.

More specifically, it is an object of the present invention to provide a sprocket chain having a removable pin establishing a pivot connection between adjacent links, the pin being locked against removal except when adjacent links are disposed out of parallelism by an angularity amount greater than encountered in normal usage.

Other objects and features of the invention will become apparent as the description proceeds, especially when taken in conjunction with the accompanying drawings, wherein.

Figure 1:
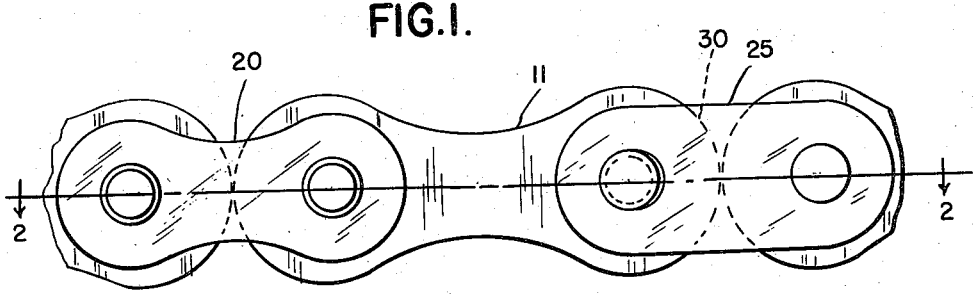
Figure 1 is a side elevation of a portion of chain embodying the present invention.
Figure 2:
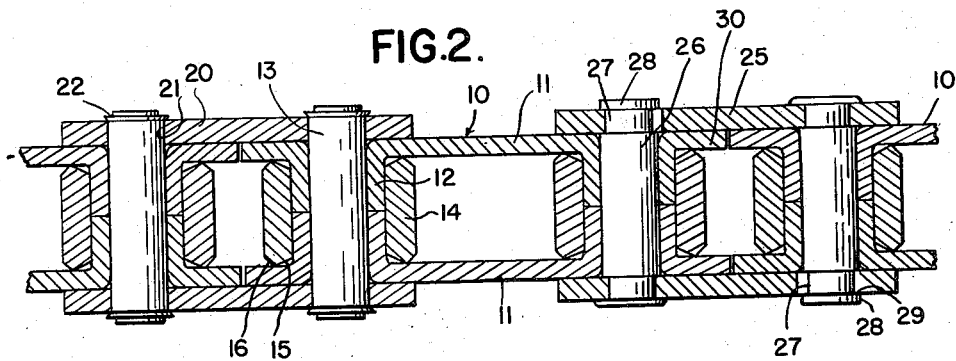
Figure 2 is a section on the line 2—2, Figure 1.
Figure 3:
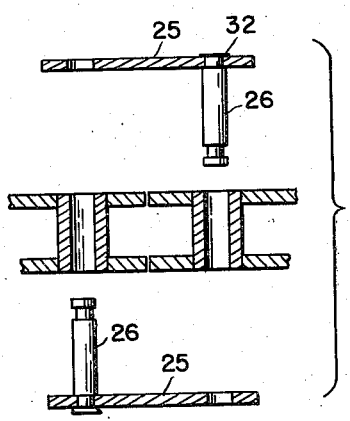
Figure 3 is an exploded sectional view of the separable link construction illustrated in Figures 1 and 2.

Referring now to the drawings in Figures 1–3, there is illustrated a sprocket chain made up of links indicated generally at 10, each link comprising link bars 11 provided adjacent their ends with confronting tubular sleeve portions 12 which together cooperate to form a sleeve for the reception of pivot pins 13. Surrounding the sleeve formed between sleeve portions 12 are cylindrical rollers 14 herein illustrated as shaped at their ends to provide clearance as indicated at 15 for the fillet between the inner surface of the link bars 11 and the outer surface of the tubular link portions 12. If desired, the outer corners of the rollers 14 may be relieved as indicated at 16 to reduce the area of contact between the ends of the surface of the rollers 14 and the inner surfaces of the link bars 11.

Throughout the major extent of the chain the adjacent links 10 are pivoted together through the medium of connecting link plates 20 which are provided with openings 21 for the reception of the laterally extending ends of the pivot pins 13. Where the pins 13 extend outwardly beyond the outer surfaces of the connecting link plates 20 they are riveted over as indicated at 22.

In order to permit breaking the chain one or more connecting link plates of the special type illustrated at 25 are provided. These link plates 25 may be shaped to have separable interlocking engagement with special type pivot pins 26. As illustrated in Figures 2 and 3, each of the link plates 25 may be permanently interlocked as by rivets with one of the pivot pins 26 and have releasable or removable interlocking engagement with a second pivot pin 26. Each of the pivot pins 26 is provided at one end with a reduced annular groove 27 leaving a head 28 outwardly therefrom which provides an inwardly facing locking shoulder 29. As illustrated in this embodiment of the invention, the head 28 of the pin is of the same diameter as the intermediate portion thereof although this is not essential.

Each of the link bars 11 has at its end an outwardly extending flange portion 30 which is eccentrically disposed with respect to the axis of the sleeve portion 12. The eccentricity of the flange portion 30 is such that its center of curvature is located nearer the end of the link bar 11 than is the axis of the sleeve portion 12. As a result, the flange portion 30 extends further from the axis of the sleeve portion 11 in a direction longitudinally of the link than it does at an angle thereto.

Accordingly, when the parts are assembled as illustrated in Figure 2, the ends of the flanges 30 are in close proximity and serve to prevent movement of the adjacent pins 26 toward each other by an amount sufficient to release the link plates 25 from their interlocking engagement beneath the shoulder portions 29 of the heads of the pins. However, when adjacent links 10 are disposed angularly with respect to each other at a substantial angle the portions of the flanges 30 which are adjacent are of less radial extent and may permit the pins 26 to move toward each other by an amount sufficient to provide for disengagement of the connecting plates 25. It will be appreciated that the specific design of the flanges 30 may be such as to require any predetermined angularity between adjacent links or between one link and the interconnecting link plate 25. At all events, the design is such that removal of the link plates 25 is prevented unless the angularity between one or both of the adjacent links 10 with respect to the connecting link plate 25 is greater than the angularity which results in use. It will be understood of course that the angularity which results in use is a function of the diameter of the smallest sprocket on which the chain runs.

In the embodiment of the invention just described it will be noted that a link plate 25 and associated releasable pin 26 are permanently engaged as by riveting indicated at 32. This is a matter of convenience and has the advantage that when the parts are disassembled the relatively small pin 26 is affixed to a link plate 25 so that the parts are substantially easier to handle. However, it will be readily seen that if desired, pins 26 could be provided with the interlocking grooves 27 at both ends and could be completely disassociated from both of the link plates.

Figure 4:
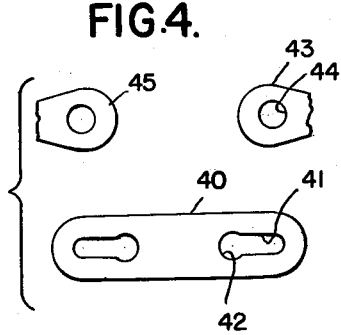
Figure 4 is an exploded view illustrating diagrammatically yet another embodiment of the present invention.

Referring now to Figure 4 there is illustrated another embodiment of the present invention. In this figure only the parts which differ from the embodiment previously described are illustrated. In this case the connecting link plate 40 is provided with relatively long slots 41 opening at their inner ends into enlarged portions 42, the two parts cooperating to form a key-hole type opening. In this figure ends of adjacent links 43 are illustrated which have openings therein through which extend headed ends 44 of pivot pins. This type of construction is intended for use with a chain in which all of the pivot pins in use are positioned equal distances apart so that a tooth of the sprocket may enter between each adjacent pair of pivot pins.

The ends of the links 43 are again provided with flange portions 45 which are eccentric with respect to the axis of the pivot pins so that when adjacent links are in longitudinal alignment, the pivot pins are prevented from registering with the enlarged portions 42 of the key-hole openings in the connecting link plates 40.

Figure 5:
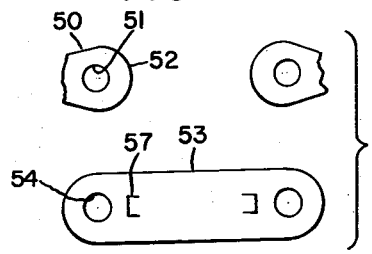
Figure 5 is an exploded view illustrating diagrammatically yet another embodiment of the present invention.
Figure 6:
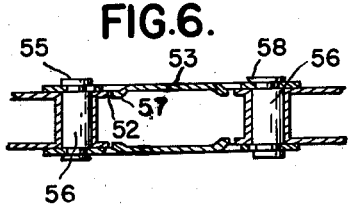
Figure 6 is a longitudinal section through a portion of a chain assembled from the elements illustrated in Figure 5.

Referring now to Figure 5, there is illustrated another embodiment of the present invention. In this case, rather than depending upon engagement between the ends of adjacent links, other means are provided for maintaining locked engagement of the link plates with the pins. In this case, the ends of adjacent links are illustrated at 50 and they are provided with pin receiving openings 51 which are eccentric with respect to the end flange portions 52. The connecting link plates 53 are provided with openings 54 for passing over the heads 55 of pins 56 as illustrated in Figure 6. Formed on the inner side of the link plates 53 are lugs 57 which align with the flange portions 52 of the links. Since the flange portions 52 are eccentric with respect to the openings 51, the heads 55 of the pins 56 are interlocked as illustrated in Figure 6 with the side walls of the openings 54 and are prevented from removal until the link plate 53 is angularly disposed with respect to the adjacent link such that the lug 57 is adjacent to a portion of the flange 53 of sufficiently small radial extent as to permit movement of the link plate 53 into disengaging position. In this case it will be observed that each of the pins 56 may be independently removable. However, for reasons outlined in connection with the description of Figures 1–3, it is preferred to provide link plates 53 in identical pairs, each of which has a pivot pin 56 permanently secured adjacent one end thereof as by the riveting indicated at 58.

Figure 7:
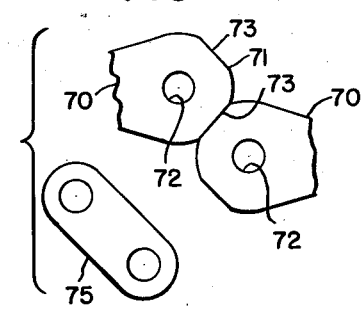
Figure 7 is an exploded view illustrating diagrammatically yet another embodiment of the present invention.

In Figure 7 there is illustrated a slightly different embodiment of link bar. In this case, the ends of adjacent link bars 70 are illustrated and instead of providing the flange portions 71 eccentrically with respect to the axis of the pin receiving openings 72, these flange portions are otherwise shaped to permit an equivalent result. In the illustrated embodiment, chordal flats 73 are provided which permit adjacent openings 72 to be moved toward each other by an amount which permits removal of the interlocking connecting link plate 75. It will be understood that while the ends of the adjacent links 70 are shown as symmetrically shaped, the same result could be obtained by appropriately shaping the flange portion 71 of only one of the links 70, or one side only of each link.

Figure 8:
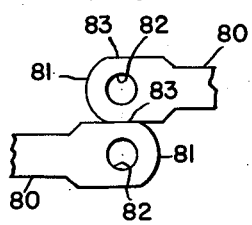
Figure 8 is a view illustrating diagrammatically yet another embodiment of the present invention.
Figure 12:
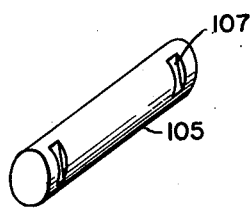
Figure 12 is a perspective view of a pivot pin which may be employed in the embodiment of the invention illustrated in Figures 10 and 11.
Figure 10:
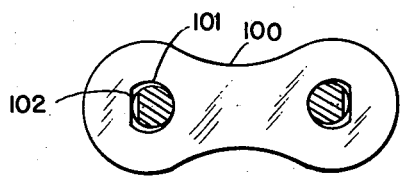
Figure 10 is a diagrammatic view illustrating the relationship between a pair of removable pins and the associated connected link plate in position to permit removal of the pins.
Figure 11:
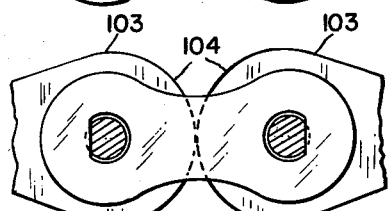
Figure 11 is a view similar to Figure 10 showing the pins moved to interlocking position with the connecting link plate.
Figure 13:
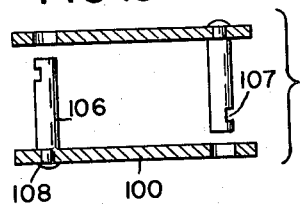
Figure 13 is an exploded sectional view illustrating diagrammatically the use of a slightly different sub-assembly of the pins and plates employed in the embodiment illustrated in Figures 10 and 11.
Figure 14:
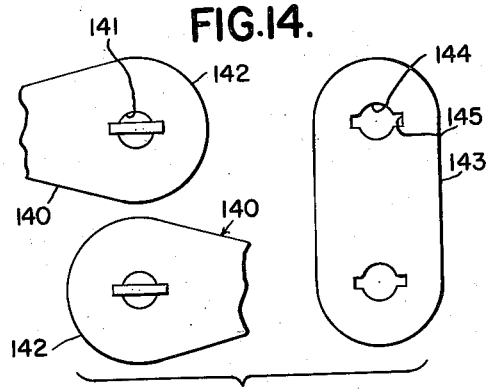
Figure 14 is an exploded view illustrating diagrammatically yet another embodiment of the present invention.

Referring to Figure 8 there is diagrammatically illustrated a slightly different embodiment of the present invention. In this case, the adjacent ends of links 80 have flange portions 81 which are or may be concentric with the pin receiving openings 82. However, each of the flange portions 81 is flattened as illustrated at 83 to permit a sufficient reduction in the spacing between openings 82 to provide for removal of the connecting link plate (not shown). In this case, as in all embodiments of the present invention, removal of the removable connecting link plates depends upon establishing an angularity between adjacent links or link plates which is greater than the angularity which these parts assume in use.

Figure 9:
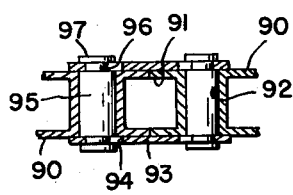
Figure 9 is a fragmentary longitudinal section illustrating yet another embodiment of the present invention.

Referring now to Figure 9 there is illustrated yet another embodiment of the present invention. In this case, links 90 are provided with flange portions 91 which are eccentric with respect to the axis of the pin receiving openings 92. Connecting link plates 93 have enlarged openings 94 at each end and the pins 95 have reduced annular grooves 96 adjacent both ends which provides heads 97 adapted to interlock with the openings 94 formed in the link plates 93. In this construction, when one or both of the links 90 are disposed out of longitudinal alignment with the connecting link plate 93 by a sufficient amount, link plates 93 may be disengaged from beneath the heads 97 and removed. In this case, removal of the link plates 93 permits removal of the pins 95 and these parts may be removed independently.

Referring now to the construction illustrated in Figures 10–13 there is illustrated a construction which provides for increased ability to withstand wear in usage. In this case, the connecting link plates 100 are provided with enlarged D-shaped openings 101 having flats 102 at their outer ends. The link plates 100 are intended to pivotally connect links 103 having cooperating flange portions 104 which may be eccentric with respect to the pin openings or which may be otherwise shaped as illustrated in Figures 7 and 8 as desired. In this case, the connecting pins may be separate from the link plates, a pin of this type being illustrated at 105 in Figure 12; or the pins may be permanently connected to one of the connecting plates 100, a pin of this type being illustrated at 106 in Figure 13.

In either case, the pin 105 or 106 is provided with a flat bottomed recess 107 which in use is adapted to have surface to surface contact with the flat 102 formed in the openings 101. It is preferred to insure surface to surface contact between these flat surfaces by effecting a rigid interlock between a pivot plate 100 of the pin as illustrated by the riveted connection 108 shown in Figure 13. However, even if this is not provided and a pin such as the pin 105 is employed, the cooperation between the flat surfaces referred to will retain the pin in proper orientation with respect to the connecting link plates 100. In use the intermediate portion of the pin 105 or 106 is in surface to surface contact with a sleeve of the type fully illustrated in Figure 2 and the flat bottom of the notch or notches 107 assures extended area contact between the pin and connecting link plate, thus reducing wear during use of the chain.

Figure 16:
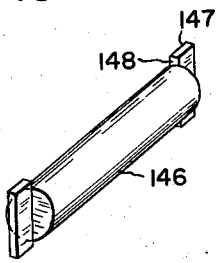
Figure 16 is a perspective view of a link pin employed in the structure illustrated in Figures 14 and 15.
Figure 15:
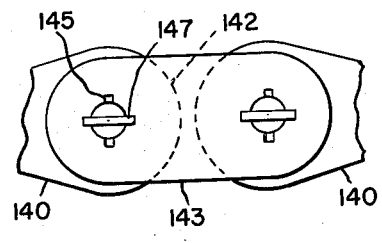
Figure 15 is a side elevation of the elements illustrated in Figure 14 assembled together.

Referring now to Figures 14–17 there is illustrated yet another embodiment of the present invention. In this case, the ends of the links 140 are provided with pin receiving openings 141 which may be concentric with the flange portions 142. The connecting link plates 143 are provided with pin receiving openings comprising a circular portion 144 and laterally extending reduced portions 145. The pins which cooperate with the links 140 and the link plates 143 are illustrated in perspective in 146 and in this embodiment of the invention comprise a central cylindrical portion terminating at each end in a flat key at 147. Each of the keys provide inwardly facing locking shoulders 148. If the pin illustrated in Figure 16 is employed, the openings 141 at the ends of the adjacent links 140 must of course be shaped to permit passage of the keys 147. In Figure 15 the assembly of the parts is illustrated when the links 140 and connecting link plates 143 are in substantial longitudinal alignment. At this time it will be observed that the keys 147 are disposed substantially perpendicular to the laterally extending portions 145 of the openings in the link plate 143. In this case, no dependence is made upon engagement between the flange portions 142 of the ends of the links 140 and these accordingly may be substantially spaced as indicated at Figure 15. In order to effect separation between the links 140 it is necessary only to swing the link plate 143 to a position displaced angularly 90° from the position illustrated in Figure 15, at which time the keys 147 will register with the laterally extending portions 145 of the plate openings.

Figure 17:
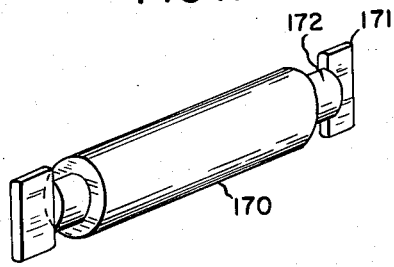
Figure 17 is a perspective view of a link pin similar to that shown in Figure 16 but differing therefrom in specific details.

In Figure 17 at 170 there is illustrated a somewhat different type of pin which is provided with a flat key 171 and a reduced cylinder portion 172. The ends of the keys 171 do not extend radially beyond the intermediate cylindrical portion of the pins 170. In this case, therefore, the openings provided in the ends of the links 140 need not be provided with laterally extending openings, since the entire pin 170 may pass through a cylindrical opening shaped to closely engage the central cylindrical portion thereof. In the embodiment of the invention illustrated at Figures 14–17 it is intended that the pins 146 or 170 will be engaged with a press fit in the openings formed at the ends of the adjacent links so that in use the pins are held against relative rotation with respect thereto.

Although a number of different specific embodiments of the present invention have been illustrated and described, it will be understood that all of these embody the same fundamental thought. This is the provision of a releasable connection between adjacent links of a sprocket chain which depends upon disposing the adjacent links or a link and its adjacent connecting link plate out of alignment by an amount more than is encountered in use. By virtue of this provision it becomes a relatively simple matter to grasp a sprocket chain constructed in accordance with the present invention and to bend the chain as described, at which time slight pressure on the releasable producting end of one or more pins will effect separation of the chain. This is an operation which may be performed readily with two hands and is substantially more simple than any method of effecting separation between links of a sprocket chain than has heretofore been known.

The drawings and the foregoing specification constitute a description of the improved chain structure in such full, clear, concise and exact terms as to enable any person skilled in the art to practice the invention, the scope of which is indicated by the appended claim.

What we claim as our invention is:

A sprocket chain comprising links each of which comprises a pair of identical link bars, the ends of which are formed on circular arcs, each link bar having integrally formed tubular collars adjacent its ends, the axes of said collars being spaced inwardly from the centers of curvature of the ends of said link bars, said link bars being assembled in pairs with the ends of their collars abutting, tubular rollers surrounding said collars, the corners between the inner surfaces of said link bars and the collars formed thereon being rounded to form fillets, the ends of said rollers being relieved to clear said fillets, pins extending through said collars and laterally beyond the outer surfaces of said link bars, a pair of link plates having pin receiving openings adjacent their ends assembled against the outer surfaces of adjacent pairs of said link bars, each link plate of the pair being permanently connected at one end to one end of one of the pins associated therewith, the other end of said pins having a headed end, the other end of each of said link plates having an enlarged opening through which the headed end of the associated pin may pass, the curved ends of adjacent link bars being in proximity when adjacent link bars and link plates are aligned and serving to retain the headed end of said pins out of alignment with the enlarged openings in the associated link plates, the curved ends of said link bars being spaced when adjacent link plates and link bars are angularly related to permit removal of said link plates.

DONALD J. McINTOSH.
MITCHELL SMITH.

REFERENCES CITED

The following references are of record in the file of this patent:

UNITED STATES PATENTS

| Number | Name | Date |
|---|---|---|
| 10,413 | Wallis | Nov. 27, 1883 |
| 818,469 | Rogers | Apr. 24, 1906 |
| 1,146,905 | Stark | July 20, 1915 |
| 1,464,267 | Harrison | Aug. 7, 1923 |

FOREIGN PATENTS

| Number | Country | Date |
|---|---|---|
| 34,581 | France | Feb. 26, 1929 |